United States Patent
Prissok et al.

(10) Patent No.: US 11,505,662 B2
(45) Date of Patent: Nov. 22, 2022

(54) ELASTIC MEMBRANE

(71) Applicant: BASF SE, Ludwigshafen am Rhein (DE)

(72) Inventors: Frank Prissok, Lemfoerde (DE); Juergen Ahlers, Ludwigshafen (DE); Martin Weber, Ludwigshafen (DE); Oliver Gronwald, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 295 days.

(21) Appl. No.: 16/646,255

(22) PCT Filed: Oct. 8, 2018

(86) PCT No.: PCT/EP2018/077308
§ 371 (c)(1),
(2) Date: Mar. 11, 2020

(87) PCT Pub. No.: WO2019/072757
PCT Pub. Date: Apr. 18, 2019

(65) Prior Publication Data
US 2020/0277458 A1    Sep. 3, 2020

(30) Foreign Application Priority Data
Oct. 10, 2017   (EP) ..................... 17195796

(51) Int. Cl.
| | | |
|---|---|---|
| *C08J 5/18* | (2006.01) | |
| *B32B 27/12* | (2006.01) | |
| *B32B 27/40* | (2006.01) | |
| *C08G 18/32* | (2006.01) | |
| *C08G 18/48* | (2006.01) | |
| *C08G 18/76* | (2006.01) | |

(52) U.S. Cl.
CPC .............. *C08J 5/18* (2013.01); *B32B 27/12* (2013.01); *B32B 27/40* (2013.01); *C08G 18/3206* (2013.01); *C08G 18/4854* (2013.01); *C08G 18/7664* (2013.01); *B32B 2307/51* (2013.01); *B32B 2437/00* (2013.01); *C08J 2375/08* (2013.01)

(58) Field of Classification Search
CPC ......... C08J 5/18; C08J 2375/08; B32B 27/40; B32B 27/12; B32B 2437/00; B32B 2307/51; C08G 18/3206; C08G 18/4854; C08G 18/7664
USPC .................................................. 428/423.1
See application file for complete search history.

(56) References Cited

U.S. PATENT DOCUMENTS

| | | | | |
|---|---|---|---|---|
| 3,715,326 | A | * | 2/1973 | Traubel ............ C08J 9/28 521/64 |
| 3,953,566 | A | | 4/1976 | Gore |
| 3,962,153 | A | | 6/1976 | Gore |
| 5,562,977 | A | | 10/1996 | Jager et al. |

FOREIGN PATENT DOCUMENTS

| | | |
|---|---|---|
| CN | 105693992 | 6/2016 |
| GB | 1 210 691 A | 10/1970 |
| RU | 2167702 | 5/2001 |
| WO | 2009/009571 | 1/2009 |
| WO | WO 2017/178482 A1 | 10/2017 |

OTHER PUBLICATIONS

International Search Report dated Jan. 16, 2019 in PCT/EP2018/077308, 2 pages.
International Preliminary Report on Patentability and Written Opinion dated Apr. 16, 2020 in PCT/EP2018/077308 (with English Translation ), 13 pages.
Thomson Scientific. London. GB; XP002779369, vol. 2005, No. 30, AN 2005-285963, abstract No. 0; pp. 1 Retrieved from: Database WPI [online].
Kunststoffhandbuch, 7. „Polyurethane, Carl Hanser Verlag, 1993, Sektion 3.1; 19 pages.
Kunststoffhandbuch, 7, „Polyurethane, Carl Hanser Verlag, 1966, Seiten 103-113; 27 pages.
Pisarenko, Z.J. Chavin "Kurs organitscheskoj chimii", Visshaja shkola, 1968, str. 475 [A.P. Pisarenko, Z.J. Chavin "Course of organic chemistry", 1968, p. 478].
Russian Office Action dated Feb. 28, 2022, in Russian Application No. 2020115550, 8 pages.
V.M. Sutagin, L.I. Bondaletova "Chimija i fizika polymerov", Utschebnoje posobije. Tomsk: Izd-vo TPU, 2003, str. 132, 140, 142, 151, 173 [V.M. Sutagin, L.I. Bondaletova "Chemistry and physic of polymers", learning guide, Tomsk: publisher TPU, 2003. p. 132, 140, 142, 151, 173].
Chinese Office Action dated Jun. 24, 2022, in Japanese Application No. 20188065991.8, with English translation, 14 pages.
"Textile Design", edited by Li Donggao et al, China Textile Publishing House, May 31, 2006, p. 315.

* cited by examiner

*Primary Examiner* — Hui H Chin
(74) *Attorney, Agent, or Firm* — Grüneberg and Myers, PLLC

(57) ABSTRACT

The invention relates to an elastic membrane comprising an elastomer having an elongation at break of greater than 150% measured according to DIN 53504, wherein the thermoplastic elastomer (P1) comprises a polyurethane elastomer based on the following components:
  11 % to 79% by weight of a mixture of at least one diol (D1) and at least one isocyanate (I1),
  21% to 89% by weight of at least one compound (C1) having at least two isocyanate-reactive groups.

11 Claims, No Drawings

ELASTIC MEMBRANE

The present invention relates to an elastic membrane comprising an elastomer having an elongation at break of greater than 150% measured according to DIN 53504. The invention further relates to a process for producing the elastic membrane and elastic membranes obtained or obtainable by this process, having an elongation at break of greater than 150% measured according to DIN 53504. The invention further relates to an elastic fabric comprising a fabric and at least one laminated-on elastic membrane, having an overall elongation at break of greater than 150% measured according to DIN 53504, and also to the use of an elastic membrane for the coating of fabric.

Waterproof, breathable clothing and shoes normally comprise, as functional layer, expanded polytetrafluoroethylene (ePTFE) (U.S. Pat. Nos. 3,953,566, 3,962,153) or polyester (Sympatex) (U.S. Pat. No. 5,562,977) in the form of membranes or thin films. The use of halogen-containing ePTFE is questionable for environmental protection reasons alone. Furthermore, it is a problem with non-thermoplastic materials that the functional layer usually needs to be sewn onto the support material, with the seam stitches rendering the material of the functional layer permeable to water (US 2015/0230563). The water resistance must therefore typically be established subsequently by sealing the seam with an overlying adhesive or a sealing tape, with the sealing being effected by means of a bonding or welding process. Alternatives to sewing are to date not known and methods such as for example planar adhesive bonding are accompanied by disadvantages, for instance the functional materials lose their breathability as a result of planar adhesive bonding and over the course of time detachment phenomena arise, etc. For currently known thermoplastic elastomer films, which are also used in the clothing, shoe or outdoor sectors, it is usually disadvantageous that these films do display relatively high water vapor permeability on account of their high water absorption, but also very high swelling, and in terms of wearing comfort are not comparable to porous membranes.

The object of the present invention was therefore that of providing thermoplastic materials which do not have the abovementioned disadvantages, in particular the intention was to provide a thermoplastic material which in addition to good watertightness (LEP) and water vapor permeability (WVP) nevertheless has good mechanical properties.

According to the invention, this object has been achieved with an elastic membrane comprising an elastomer having an elongation at break of greater than 150% measured according to DIN 53504.

In a preferred embodiment, the elastic membrane has pores having an average pore diameter of less than 2000 nm, determined by means of Hg porosimetry in accordance with DIN 66133. The elastic membrane particularly preferably has an average pore diameter in the range from 0.001 µm to 0.8 µm, determined by means of Hg porosimetry in accordance with DIN 66133, and an average thickness of the membrane of less than 200 µm, preferably in the range from 5 to 100 µm.

In the context of the present invention, a membrane is understood to be a thin, semipermeable structure which is capable of separating two liquids or molecular and/or ionic components or particles from a liquid. A membrane acts as a selective barrier which permits the passage of some particles, substances or chemicals, while retaining others. For example, a membrane may be a reverse osmosis (RO) membrane, a forward osmosis (FO) membrane, nanofiltration (NF) membrane, ultrafiltration (UF) membrane or a microfiltration (MF) membrane.

The elastic membranes of the invention have improved mechanical properties such as for example an increased modulus of elasticity and an increased elongation at break. At the same time, they have characteristics comparable to membranes of the prior art with respect to WVP and LEP. Also included among the improved mechanical properties of the elastic membrane of the invention is the fact that the tensile strength thereof measured according to DIN 53504 is greater than 5 MPa.

In a preferred embodiment of the elastic membrane, the relative water vapor permeability ($WVP_{rel}$) at 38° C. and 90% relative humidity in accordance with DIN 53122 is greater than 50 [$g*mm/m^2*d$] and the absolute water vapor permeability ($WVP_{abs}$) at 38° C. and 90% relative humidity in accordance with DIN 53122 is greater than 1000 [$g/m^2*d$].

In a further preferred embodiment of the elastic membrane, the watertightness (LEP) is greater than 2 bar and more preferably is in the range from 2 to 5 bar, more preferably in the range from 3 to 4 bar, determined according to DIN EN 20811.

The pore size distribution within the membrane is preferably not homogeneous; the membrane preferably comprises pores having various pore sizes. The pore size distribution preferably has a gradient across the diameter of the membrane, with a gradient within the context of the invention being understood to mean that pores on a first surface of the membrane or close to this surface have an average pore diameter which differs from the average pore diameter of a second surface or close to this second surface. Within the context of the present invention, it is for example possible that the pores at or close to the first surface have an average pore diameter in the range from 0.001 µm to 0.01 µm, determined by means of Hg porosimetry in accordance with DIN 66133, and that the pores at or close to the second surface have an average pore diameter in the range from 0.1 µm to 0.8 µm, determined by means of Hg porosimetry in accordance with DIN 66133. The degree of the gradient of the pore diameter within the membrane can vary within wide ranges. The ratio of the pore diameter of pores at or close to the first surface of the membrane to that of the pores at or close the second surface may for example be in the range from 1:5 to 1:10 000, preferably in the range from 1:10 to 1:1000, more preferably in the range from 1:100 to 1:500. In a preferred embodiment, the pore size distribution of the elastic membrane has a gradient across the diameter of the membrane.

In a preferred embodiment of the elastic membrane, the elastomer comprises a thermoplastic elastomer (P1). The thermoplastic elastomer (P1) is preferably selected from the group consisting of polyurethane elastomer, polyester elastomer, polyetherester elastomer, polyesterester elastomer, polyimide elastomer, polyetheramide elastomer, polystyrene elastomer and ethylene-vinyl acetate elastomer, preferably polyurethane elastomer.

In a particularly preferred embodiment, the thermoplastic elastomer (P1) is a polyurethane elastomer based on the following components:
  11% to 79% by weight of a mixture of at least one diol (D1) and at least one isocyanate (I1),
  21% to 89% by weight of at least one compound (C1) having at least two isocyanate-reactive groups.

In a more preferred embodiment, the thermoplastic elastomer (P1) is a polyurethane elastomer based on the following components:

15% to 75% by weight of a mixture of at least one diol (D1) and at least one isocyanate (I1), 25% to 85% by weight of at least one compound (C1) having at least two isocyanate-reactive groups.

More preferably, the thermoplastic elastomer (P1) is a polyurethane elastomer based on the following components:

20% to 75% by weight of a mixture of at least one diol (D1) and at least one isocyanate (I1), 25% to 80% by weight of at least one compound (C1) having at least two isocyanate-reactive groups.

More preferably, the thermoplastic elastomer (P1) is a polyurethane elastomer based on the following components:

55% to 70% by weight of a mixture of at least one diol (D1) and at least one isocyanate (I1), 30% to 45% by weight of at least one compound (C1) having at least two isocyanate-reactive groups.

The molar ratio of the at least one diol (D1) and the at least one polyisocyanate (I1) is typically in the range from 95:100 to 100:95. The molar ratio of the at least one diol (D1) and the at least one polyisocyanate (I1) is preferably in the range from 98:100 to 100:98, more preferably in the range from 99:100 to 100:99.

The at least one compound (C1) can be any compound having at least two isocyanate-reactive groups. The isocyanate-reactive groups are preferably hydroxy or amino groups. The at least one compound (C1) can be added to modify the properties of the thermoplastic elastomer (P1). Any compound can be used as long as it is suitable for producing a thermoplastic elastomer (P1), in particular a polyurethane elastomer, with the mixture of the at least one diol (D1) and the at least one polyisocyanate (I1). For example, the at least one compound (C1) can be a polyol, or alternatively a polymer having at least two hydroxy groups or at least two amino groups other than a polyol, for example a hydrophobic polymer or oligomer comprising silicon.

In one embodiment, the at least one compound (C1) is a polyol. All suitable polyols are usable here, for example polyether diols or polyester diols, or mixtures of two or more thereof. Suitable polyether polyols or polyether diols are by way of example polyether diols based on ethylene oxide or propylene oxide or mixtures thereof, for example copolymers such as block copolymers. In addition, any suitable polyester diol can be used, with polyester diol also comprising polycarbonate diols here.

In a preferred embodiment of the elastic membrane, the at least one compound (C1) having at least two isocyanate-reactive groups is a polyol, preferably polytetrahydrofuran (pTHF).

The at least one isocyanate (I1) is preferably at least one polyisocyanate (I1). Polyisocyanates (I1) that may be used are aliphatic, cycloaliphatic, araliphatic and/or aromatic diisocyanates. Examples that may be mentioned are the following aromatic isocyanates: toluene 2,4-diisocyanate, mixtures of toluene 2,4- and 2,6-diisocyanate, diphenylmethane 4,4'-, 2,4'- and/or 2,2'-diisocyanate (MDI), mixtures of diphenylmethane 2,4'- and 4,4'-diisocyanate, urethane-modified liquid diphenylmethane 4,4'- and/or 2,4'-diisocyanate, 4,4'-diisocyanatodiphenylethane, mixtures of monomeric methanediphenyl diisocyanates and other highly polycyclic homologs of methanediphenyl diisocyanate (polymeric MDI), naphthylene 1,2- and 1,5-diisocyanate.

Aliphatic diisocyanates are customary aliphatic and/or cycloaliphatic diisocyanates, for example tri-, tetra-, penta-, hexa-, hepta-, and/or octamethylene diisocyanate, 2-methylpenta methylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate (H12MDI).

The at least one polyisocyanate (I1) is preferably selected from the group consisting of diphenylmethane diisocyanate (MDI), toluene diisocyanate (TDI), hexamethylene diisocyanate (HDI) and dicyclohexylmethane 4,4'-diisocyanate (H12MDI), more preferably MDI.

The polyisocyanate can be used in pure form or in the form of a composition, for example as an isocyanate prepolymer. In addition, a mixture comprising polyisocyanate and at least one solvent can be used, suitable solvents being known to those skilled in the art.

Polyisocyanate prepolymers can be obtained by means of reaction of the abovedescribed polyisocyanates in excess, for example at temperatures in the range from 30 to 100° C., preferably at more than 80° C., with polyols to obtain the prepolymer. For the preparation of the prepolymer, preference is given to using polyisocyanates and commercially available polyols based on polyesters, proceeding for example from adipic acid, or on polyethers, proceeding for example from tetrahydrofuran, ethylene oxide and/or propylene oxide.

Polyols are known to those skilled in the art and described for example in "Kunststoffhandbuch, 7, Polyurethane" [Plastics Handbook, 7, Polyurethanes], Carl Hanser Verlag, 3rd edition 1993, section 3.1. Polyols which are preferably used are polymeric compounds having hydrogen atoms which are reactive toward isocyanates. Particularly preferred polyols are polyetherols.

In the preparation of the polyisocyanate prepolymers, customary chain extenders or crosslinking agents can optionally be added to the polyols. Preferred chain extenders are butane-1,4-diol, dipropylene glycol and/or tripropylene glycol. In this case, the ratio of the organic polyisocyanates to polyols and chain extenders is preferably selected such that the isocyanate prepolymer has an NCO content in the range from 2% to 30%, more preferably in the range from 6% to 28%, more preferably in the range from 10% to 24%.

The diol (D1) used can generally be any diol. Diol (D1) is preferably selected from the group consisting of aliphatic, araliphatic, aromatic, and/or cycloaliphatic compounds having a molar mass in the range from 0.05 kg/mol to 0.499 kg/mol, preferably difunctional compounds, for example diamines and/or alkanediols having 2 to 10 carbon atoms in the alkylene portion, di-, tri-, tetra-, penta-, hexa-, hepta-, octa-, nona-, and/or decaalkylene glycols having from 3 to 8 carbon atoms, especially ethylene-1,2-glycol, propane-1,3-diol, butane-1,4-diol, hexane-1,6-diol, and preferably corresponding oligo- and/or polypropylene glycols such as diethylene glycol, dipropylene glycol, cyclohexane-1,4-diol, 1,4-dimethanolcyclohexane, and neopentyl glycol, and the use of mixtures is also possible. The diols preferably have solely primary hydroxy groups, with particular preference being given to ethanediol, butanediol and hexanediol. Diol (D1) is therefore preferably selected from the group consisting of ethanediol, butanediol and hexanediol and particularly preferably comprises at least butane-1,4-diol.

In the preparation of the thermoplastic elastomer (P1), further compounds such as for example catalysts and/or customary auxiliaries and/or additives may be used.

Customary auxiliaries are for example surface-active substances, fillers, flame retardants, nucleating agents, oxidation stabilizers, lubricants and mold release aids, dyes, pigments and optionally stabilizers, for example for protection against hydrolysis, light, heat or discoloration, inorganic and/or organic fillers, reinforcers and plasticizers. Customary auxiliaries and additives can be found for example in the "Kunststoffhandbuch" [Plastics Handbook] ("Kunststoffhandbuch"; 7, "Polyurethane" [Polyurethanes], Carl Hanser Verlag, 1966, pages 103-113).

According to the invention, it has been found that when at least one thermoplastic elastomer (P1), in particular a polyurethane elastomer, as described above is used, stable films or membranes can be created by means of phase inversion from a suitable solution of the thermoplastic elastomer (P1), in particular of the polyurethane elastomer.

In a further aspect, the invention therefore also relates to a process for producing an elastic membrane comprising an elastomer having an elongation at break of greater than 150% measured according to DIN 53504, comprising:
  (i) providing a solution (L1) comprising at least one thermoplastic elastomer (P1);
  (ii) creating a membrane from the solution (L1) by means of phase inversion.

According to (i), a solution (L1) comprising at least one thermoplastic elastomer (P1) is provided. The solution (L1) comprises the thermoplastic elastomer (P1), in particular a polyurethane elastomer as described above, and at least one suitable solvent or a solvent mixture. Suitable solvents are for example selected from the group consisting of organic, in particular aprotic polar organic solvents. Suitable solvents have a boiling point in the range from 80 to 320° C., preferably in the range from 100 to 280° C., more preferably in the range from 150 to 250° C. Suitable aprotic polar organic solvents are for example high-boiling ethers, esters, ketones, asymmetrically halogenated hydrocarbons, anisole, N,N-dimethylformamide, N,N-dimethylacetamide, dimethyl sulfoxide, sulfolane, N,N-dimethyl-2-hydroxypropanamide, N,N-diethyl-2-hydroxypropanamide, N,N-dimethyl-2-methoxypropanamide, N,N-diethyl-2-methoxypropanamide, N-formylpyrrolidine, N-acetylpyrrolidine, N-formylpiperidine, N-acetylpiperidine, N-formylmorpholine, N-acetylmorpholine, N-methyl-2-pyrrolidone and/or N-ethyl-2-pyrrolidone. Mixtures of two or more of these solvents can also be used.

Within the context of the present invention, particular preference is given to N-methylpyrrolidone as solvent for the solution (L1). The solution (L1) can include thermoplastic elastomer (P1), in particular the polyurethane elastomer, in an amount sufficient for the formation of a film from the solution. For example, the solution (L1) may include 10% to 35% by weight of the thermoplastic elastomer (P1), in particular of the polyurethane elastomer, preferably 15% to 25% by weight.

According to the invention, the solution (L1) can be prepared at elevated temperatures.

The solution (L1) comprises at least thermoplastic elastomer (P1), in particular a polyurethane elastomer, but may comprise further compounds or additives. In a preferred embodiment, the invention is directed to a process wherein the solution (L1) comprises at least one additive, selected from the group consisting of mono-, di- and trialkanols having no further functional groups, preferably from the group consisting of isopropanol, ethylene glycol, propylene glycol and propylenetriol (glycerol), preferably glycerol.

According to (ii), a membrane is created from the solution (L1) by means of phase inversion. Suitable methods are known per se to those skilled in the art. According to the invention, a non-solvent-induced phase inversion is performed. Step (ii) may therefore by way of example comprise steps (ii-a) and (ii-b).

In a further embodiment, the invention is therefore directed to a process wherein (ii) comprises (ii-a) and (ii-b):
  (ii-a) forming a film from the solution (L1);
  (ii-b) contacting the film of (ii-a) with a mixture (L2).

According to step p (ii-a), a film is formed from the solution (L1), using methods known to those skilled in the art. The film is subsequently contacted with a mixture (L2) as per (ii-b). Step (ii) induces coagulation, with membranes being obtained. The mixture (L2) can comprise any compound which is suitable for inducing coagulation (coagulant). The mixture (L2) in particular has a low solubility for the thermoplastic elastomer (P1), in particular for the polyurethane elastomer. The solvent used was that for the preparation of (L1). Preference is given to using non-solvents such as for example water or mixtures comprising water for (L2). Suitable coagulants thus comprise liquid water, water vapor, alcohols or mixtures of two or more thereof. In one embodiment, (L2) comprises a coagulant selected from the group of liquid water, water vapor, alcohols or mixtures thereof. Alcohols which are preferred as coagulants are mono-, di- or trialkanols having no further functional groups, for example isopropanol, ethylene glycol or propylene glycol. In a preferred embodiment, the invention is directed to a process wherein the mixture (L2) comprises liquid water.

According to the invention, step (ii), in particular steps (ii-a) and/or (ii-b), can be effected at elevated temperatures.

In a further embodiment, the invention is therefore directed to a process for producing an elastic membrane, comprising
  (i) providing a solution (L1) comprising at least one thermoplastic elastomer (P1);
  (ii) creating a membrane from the solution (L1) by means of phase inversion, comprising
    (ii-a) forming a film from the solution (L1);
    (ii-b) contacting the film of (ii-a) with a mixture (L2).

The process can comprise further steps, for example wash steps or a thermal treatment.

In one embodiment, the invention is directed to a process wherein the obtained elastic membrane has pores having an average pore diameter of less than 2000 nm, determined by means of Hg porosimetry in accordance with DIN 66133.

In a further embodiment, the invention is directed to a process wherein the average pore diameter of the obtained elastic membrane is in the range from 0.001 µm to 0.8 µm, determined by means of Hg porosimetry in accordance with DIN 66133, and the average thickness of the membrane is less than 200 µm, preferably in the range from 5 to 100 µm.

In a further embodiment, the invention is directed to a process wherein the tensile strength of the obtained elastic membrane, measured according to DIN 53504, is greater than 5 MPa.

In a further embodiment, the invention is directed to a process wherein the relative water vapor permeability ($WVP_{rel.}$) of the obtained elastic membrane at 38° C. and 90% relative humidity in accordance with DIN 53122 is greater than 50 [$g*mm/m^2*d$] and the absolute water vapor permeability ($WVP_{abs.}$) at 38° C. and 90% relative humidity in accordance with DIN 53122 is greater than 1000 [$g/m^2*d$].

In a further embodiment, the invention is directed to a process wherein the watertightness (LEP) of the obtained elastic membrane is greater than 2 bar and preferably is in the range from 2 to 5 bar, more preferably in the range from 3 to 4 bar, determined according to DIN EN 20811.

In a further embodiment, the invention is directed to a process wherein the pore size distribution has a gradient across the diameter of the elastic membrane.

In a further embodiment, the invention is directed to a process wherein the thermoplastic elastomer (P1) is selected from the group consisting of polyurethane elastomer, polyester elastomer, polyetherester elastomer, polyesterester elastomer, polyamide elastomer, polyetheramide elastomer, polystyrene elastomer and ethylene-vinyl acetate elastomer, preferably polyurethane elastomer.

In a preferred embodiment, the invention is directed to a process wherein the thermoplastic elastomer (P1) comprises a polyurethane elastomer based on the following components:
  11% to 79% by weight of a mixture of at least one diol (D1) and at least one isocyanate (I1),
  21% to 89% by weight of at least one compound (C1) having at least two isocyanate-reactive groups.

In a more preferred embodiment, the invention is directed to a process wherein the thermoplastic elastomer (P1) comprises a polyurethane elastomer based on the following components:
  15% to 75% by weight of a mixture of at least one diol (D1) and at least one isocyanate (I1),
  25% to 85% by weight of at least one compound (C1) having at least two isocyanate-reactive groups.

In a more preferred embodiment, the invention is directed to a process wherein the thermoplastic elastomer (P1) comprises a polyurethane elastomer based on the following components:
  20% to 75% by weight of a mixture of at least one diol (D1) and at least one isocyanate (I1),
  25% to 80% by weight of at least one compound (C1) having at least two isocyanate-reactive groups.

In a more preferred embodiment, the invention is directed to a process wherein the thermoplastic elastomer (P1) comprises a polyurethane elastomer based on the following components:
  55% to 70% by weight of a mixture of at least one diol (D1) and at least one isocyanate (I1),
  30% to 45% by weight of at least one compound (C1) having at least two isocyanate-reactive groups.

The at least one compound (C1) can be any compound having at least two isocyanate-reactive groups. The isocyanate-reactive groups are preferably hydroxy or amino groups. The at least one compound (C1) can be added to modify the properties of the thermoplastic elastomer (P1). Any compound can be used as long as it is suitable for producing a thermoplastic elastomer (P1), in particular a polyurethane elastomer, with the mixture of the at least one diol (D1) and the at least one polyisocyanate (I1). For example, the at least one compound (C1) can be a polyol, or alternatively a polymer having at least two hydroxy groups or at least two amino groups other than a polyol, for example a hydrophobic polymer or oligomer comprising silicon.

In one embodiment, the at least one compound (C1) is a polyol. All suitable polyols are usable here, for example polyether diols or polyester diols, or mixtures of two or more thereof. Suitable polyether polyols or polyether diols are by way of example polyether diols based on ethylene oxide or propylene oxide or mixtures thereof, for example copolymers such as block copolymers. In addition, any suitable polyester diol can be used, with polyester diol also comprising polycarbonate diols here.

In a preferred embodiment of the elastic membrane, the at least one compound (C1) having at least two isocyanate-reactive groups is a polyol, preferably pTHF.

The at least one isocyanate (I1) is preferably at least one polyisocyanate (I1). Polyisocyanates (I1) that may be used are aliphatic, cycloaliphatic, araliphatic and/or aromatic diisocyanates. Examples that may be mentioned are the following aromatic isocyanates: toluene 2,4-diisocyanate, mixtures of toluene 2,4- and 2,6-diisocyanate, diphenylmethane 4,4'-, 2,4'- and/or 2,2'-diisocyanate (MDI), mixtures of diphenylmethane 2,4'- and 4,4'-diisocyanate, urethane-modified liquid diphenylmethane 4,4'- and/or 2,4'-diisocyanate, 4,4'-diisocyanatodiphenylethane, mixtures of monomeric methanediphenyl diisocyanates and other highly polycyclic homologs of methanediphenyl diisocyanate (polymeric MDI), naphthylene 1,2- and 1,5-diisocyanate.

Aliphatic diisocyanates are customary aliphatic and/or cycloaliphatic diisocyanates, for example tri-, tetra-, penta-, hexa-, hepta-, and/or octamethylene diisocyanate, 2-methylpenta methylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate.

The at least one polyisocyanate (I1) is preferably selected from the group consisting of diphenylmethane diisocyanate (MDI), toluene diisocyanate (TDI), hexamethylene diisocyanate (HDI) and dicyclohexylmethane 4,4'-diisocyanate (H12MDI), more preferably MDI. The polyisocyanate can be used in pure form or in the form of a composition, for example as an isocyanate prepolymer. In addition, a mixture comprising polyisocyanate and at least one solvent can be used, suitable solvents being known to those skilled in the art.

Polyisocyanate prepolymers can be obtained by means of reaction of the abovedescribed polyisocyanates in excess, for example at temperatures in the range from 30 to 100° C., preferably at more than 80° C., with polyols to obtain the prepolymer. For the preparation of the prepolymer, preference is given to using polyisocyanates and commercially available polyols based on polyesters, proceeding for example from adipic acid, or on polyethers, proceeding for example from tetrahydrofuran, ethylene oxide and/or propylene oxide.

Polyols are known to those skilled in the art and described for example in "Kunststoffhandbuch, 7, Polyurethane" [Plastics Handbook, 7, Polyurethanes], Carl Hanser Verlag, 3rd edition 1993, section 3.1. Polyols which are preferably used are polymeric compounds having hydrogen atoms which are reactive toward isocyanates. Particularly preferred polyols are polyetherols.

In the preparation of the polyisocyanate prepolymers, customary chain extenders or crosslinking agents can optionally be added to the polyols. Preferred chain extenders are butane-1,4-diol, dipropylene glycol and/or tripropylene glycol. In this case, the ratio of the organic polyisocyanates to polyols and chain extenders is preferably selected such that the isocyanate prepolymer has an NCO content in the range from 2% to 30%, more preferably in the range from 6% to 28%, more preferably in the range from 10% to 24%.

The at least one diol (D1) used can generally be any diol. Diol (D1) is preferably selected from the group consisting of aliphatic, araliphatic, aromatic, and/or cycloaliphatic compounds having a molar mass in the range from 0.05 kg/mol to 0.499 kg/mol, preferably difunctional compounds, for example diamines and/or alkanediols having 2 to 10 carbon atoms in the alkylene portion, di-, tri-, tetra-, penta-, hexa-, hepta-, octa-, nona-, and/or decaalkylene glycols having from 3 to 8 carbon atoms, especially ethylene-1,2-glycol, propane-1,3-diol, butane-1,4-diol, hexane-1,6-diol, and preferably corresponding oligo- and/or polypropylene glycols such as diethylene glycol, dipropylene glycol, cyclohexane-1,4-diol, 1,4-dimethanolcyclohexane, and neopentyl glycol, and the use of mixtures is also possible. The diols preferably have solely primary hydroxy groups, with particular preference being given to ethanediol, butanediol and hexanediol. The at least one diol (D1) is therefore preferably selected from the group consisting of ethanediol, butanediol and hexanediol and particularly preferably comprises at least butane-1,4-diol.

In the preparation of the thermoplastic elastomer (P1), further compounds such as for example catalysts and/or customary auxiliaries and/or additives may be used.

Customary auxiliaries are for example surface-active substances, fillers, flame retardants, nucleating agents, oxidation stabilizers, lubricants and mold release aids, dyes, pigments and optionally stabilizers, for example for protection against hydrolysis, light, heat or discoloration, inorganic and/or organic fillers, reinforcers and plasticizers. Customary auxiliaries and additives can be found for example in the "Kunststoffhandbuch" [Plastics Handbook], volume 7, published by Vieweg and Hochtlen, Carl Hanser Verlag, Munich 1966 (pages 103-113).

The elastic membrane comprising an elastomer obtained or obtainable by the process has an elongation at break of greater than 150% measured according to DIN 53504. The membrane obtained or obtainable by the process has advantageous properties such as high watertightness a (LEP, measured according to DIN EN 20811) and good water vapor permeability values (WVP, measured according to DIN 53122). For instance, the watertightness (LEP) of the elastic membrane obtained or obtainable by the process is greater than 2 bar and preferably is in the range from 2 to 5 bar, more preferably in the range from 3 to 4 bar, determined according to DIN EN 20811. The relative water vapor permeability ($WVP_{rel.}$) at 38° C. and 90% relative humidity in accordance with DIN 53122 of the elastic membrane obtained or obtainable by the process is greater than 50 [$g*mm/m^2*d$] and the absolute water vapor permeability ($WVP_{abs.}$) at 38° C. and 90% relative humidity in accordance with DIN 53122 is greater than 1000 [$g/m^2*d$]. Accordingly, the elastic membrane obtained or obtainable by the process is well suited for applications which require high water vapor permeability, for example in functional clothing.

As already stated above, the elastic membrane, obtained or obtainable by the process, has pores having an average pore diameter of less than 2000 nm, determined by means of Hg porosimetry according to DIN 66133. The average pore diameter is preferably in the range from 0.001 μm to 0.8 μm, determined by means of Hg porosimetry in accordance with DIN 66133, and the average thickness of the membrane is less than 200 μm, preferably in the range from 5 to 100 μm. The tensile strength measured according to DIN 53504 is greater than 5 MPa.

As already stated above, the elastic membrane, obtained or obtainable by the process, has a gradient across the diameter of the elastic membrane with respect to pore size distribution.

The present invention relates in a further aspect to an elastic fabric comprising a fabric and at least one laminated-on elastic membrane as described at the outset or one elastic membrane obtained or obtainable by the process described above, wherein the elastic fabric has an overall elongation at break of greater than 150% measured according to DIN 53504.

In a further aspect, the present invention further relates to the use of an elastic membrane as described at the outset or of an elastic membrane obtained or obtainable by the process described above for the coating of fabric, preferably for the production of an article selected from the group consisting of clothing, shoes, boots, protective clothing, tents, tarpaulins, backpacks and umbrellas.

In the context of clothing, functional clothing is in particular preferred, thus the elastic membrane is preferably for the production of outdoor clothing, sports clothing, for example sailing, climbing or ski clothing, rainwear, where clothing comprises trousers, jackets, gloves, hats and caps. In the context of shoes and boots, preference is likewise given to shoes and boots for the functional sector, that is to say outdoor shoes/boots, sport shoes/boots, for example sailing, climbing or ski shoes/boots, or rain shoes/boots.

The present invention is illustrated further by the following embodiments and combinations of embodiments as indicated by the corresponding references and back-references. In particular, it should be emphasized that in every instance where a range of embodiments is given, for example in the context of an expression such as "the process according to any of embodiments 1 to 4", each embodiment in this range is deemed to be explicitly disclosed to those skilled in the art, i.e. the meaning of this expression is to be understood by those skilled in the art as synonymous with "the process according to any of embodiments 1, 2, 3, and 4".

1. An elastic membrane comprising an elastomer having an elongation at break of greater than 150% measured according to DIN 53504.
2. The elastic membrane according to embodiment 1, wherein the elastic membrane has pores having an average pore diameter of less than 2000 nm, determined by means of Hg porosimetry in accordance with DIN 66133.
3. The elastic membrane according to embodiment 1 or 2, wherein the average pore diameter is in the range from 0.001 μm to 0.8 μm, determined by means of Hg porosimetry in accordance with DIN 66133, and the average thickness of the membrane is less than 200 μm, preferably in the range from 5 to 100 μm.
4. The elastic membrane according to any of embodiments 1 to 3, wherein the tensile strength measured according to DIN 53504 is greater than 5 MPa.
5. The elastic membrane according to any of embodiments 1 to 4, wherein the relative water vapor permeability ($WVP_{rel}$) at 38° C. and 90% relative humidity in accordance with DIN 53122 is greater than 50 [$g*mm/m^2*d$] and the absolute water vapor permeability ($WVP_{abs.}$) at 38° C. and 90% relative humidity in accordance with DIN 53122 is greater than 1000 [$g/m^2*d$].
6. The elastic membrane according to any of embodiments 1 to 5, wherein the watertightness (LEP) is greater than 2 bar and preferably is in the range from 2 to 5 bar, more preferably in the range from 3 to 4 bar, determined according to DIN EN 20811.
7. The elastic membrane according to any of embodiments 1 to 6, wherein the pore size distribution has a gradient across the diameter of the membrane.
8. The elastic membrane according to any of embodiments 1 to 7, wherein the elastomer comprises a thermoplastic elastomer (P1).

9. The elastic membrane according to embodiment 8, wherein the thermoplastic elastomer (P1) is selected from the group consisting of polyurethane elastomer, polyester elastomer, polyetherester elastomer, polyesterester elastomer, polyamide elastomer, polyetheramide elastomer, polystyrene elastomer and ethylene-vinyl acetate elastomer, preferably polyurethane elastomer.

10. The elastic membrane according to embodiment 8 or 9, wherein the thermoplastic elastomer (P1) comprises a polyurethane elastomer based on the following components:
    11% to 79% by weight of a mixture of at least one diol (D1) and at least one isocyanate (I1),
    21% to 89% by weight of at least one compound (C1) having at least two isocyanate-reactive groups.

11. The elastic membrane according to any of embodiments 8 to 10, wherein the thermoplastic elastomer (P1) comprises a polyurethane elastomer based on the following components:
    15% to 75% by weight of a mixture of at least one diol (D1) and at least one isocyanate (I1),
    25% to 85% by weight of at least one compound (C1) having at least two isocyanate-reactive groups.

12. The elastic membrane according to any of embodiments 8 to 11, wherein the thermoplastic elastomer (P1) comprises a polyurethane elastomer based on the following components:
    20% to 75% by weight of a mixture of at least one diol (D1) and at least one isocyanate (I1),
    25% to 80% by weight of at least one compound (C1) having at least two isocyanate-reactive groups.

13. The elastic membrane according to any of embodiments 8 to 12, wherein the thermoplastic elastomer (P1) comprises a polyurethane elastomer based on the following components:
    55% to 70% by weight of a mixture of at least one diol (D1) and at least one isocyanate (I1),
    30% to 45% by weight of at least one compound (C1) having at least two isocyanate-reactive groups.

14. The elastic membrane according to any of embodiments 10 to 13, wherein the at least one diol (D1) is selected from the group consisting of ethanediol, butanediol and hexanediol, preferably comprises at least butane-1,4-diol.

15. The elastic membrane according to any of embodiments 10 to 14, wherein the at least one isocyanate (I1) is a polyisocyanate, selected from the group consisting of diphenylmethane diisocyanate (MDI), toluene diisocyanate (TDI), hexamethylene diisocyanate (HDI) and dicyclohexylmethane 4,4'-diisocyanate (H12MDI), preferably MDI.

16. The elastic membrane according to any of embodiments 10 to 15, wherein the at least one compound (C1) having at least two isocyanate-reactive groups is a polyol, preferably pTHF.

17. A process for producing an elastic membrane comprising an elastomer having an elongation at break of greater than 150% measured according to DIN 53504, comprising:
    (i) providing a solution (L1) comprising at least one thermoplastic elastomer (P1);
    (ii) creating a membrane from the solution (L1) by means of phase inversion.

18. The process according to embodiment 17, wherein the elastic membrane has pores having an average pore diameter of less than 2000 nm, determined by means of Hg porosimetry according to DIN 66133.

19. The process according to embodiment 17 or 18, wherein the average pore diameter of the obtained elastic membrane is in the range from 0.001 μm to 0.8 μm, determined by means of Hg porosimetry in accordance with DIN 66133, and the average thickness of the membrane is less than 200 μm, preferably in the range from 5 to 100 μm.

20. The process according to any of embodiments 17 to 19, wherein the tensile strength of the obtained elastic membrane, measured according to DIN 53504, is greater than 5 MPa.

21. The process according to any of embodiments 17 to 20, wherein the relative water vapor permeability ($WVP_{rel.}$) of the obtained elastic membrane at 38° C. and 90% relative humidity in accordance with DIN 53122 is greater than 50 [g*mm/m$^2$*d] and the absolute water vapor permeability ($WVP_{abs.}$) at 38° C. and 90% relative humidity in accordance with DIN 53122 is greater than 1000 [g/m$^2$*d].

22. The process according to any of embodiments 17 to 21, wherein the watertightness (LEP) of the obtained elastic membrane is greater than 2 bar and preferably is in the range from 2 to 5 bar, more preferably in the range from 3 to 4 bar, determined according to DIN EN 20811.

23. The process according to any of embodiments 17 to 22, wherein the pore size distribution of the obtained elastic membrane has a gradient across the diameter of the elastic membrane.

24. The process according to any of embodiments 17 to 23, wherein the solution (L1) comprises at least one additive, selected from the group consisting of mono-, di- and trialkanols having no further functional groups, preferably from the group consisting of isopropanol, ethylene glycol, propylene glycol and propylenetriol (glycerol), preferably glycerol.

25. The process according to any of embodiments 17 to 24, wherein (ii) comprises (ii-a) and (ii-b):
    (ii-a) forming a film from the solution (L1);
    (ii-b) contacting the film of (ii-a) with a mixture (L2).

26. The process according to embodiment 25, wherein the mixture (L2) comprises water.

27. The process according to any of embodiments 17 to 26, wherein the thermoplastic elastomer (P1) is selected from the group consisting of polyurethane elastomer, polyester elastomer, polyetherester elastomer, polyesterester elastomer, polyamide elastomer, polyetheramide elastomer, polystyrene elastomer and ethylene-vinyl acetate elastomer, preferably polyurethane elastomer.

28. The process according to any of embodiments 17 to 27, wherein the thermoplastic elastomer (P1) comprises a polyurethane elastomer based on the following components:
    11% to 79% by weight of a mixture of at least one diol (D1) and at least one isocyanate (I1),
    21% to 89% by weight of at least one compound (C1) having at least two isocyanate-reactive groups.

29. The process according to any of embodiments 17 to 28, wherein the thermoplastic elastomer (P1) comprises a polyurethane elastomer based on the following components:
    15% to 75% by weight of a mixture of at least one diol (D1) and at least one isocyanate (I1), 25% to 85% by weight of at least one compound (C1) having at least two isocyanate-reactive groups.
30. The process according to any of embodiments 17 to 29, wherein the thermoplastic elastomer (P1) comprises a polyurethane elastomer based on the following components:
20% to 75% by weight of a mixture of at least one diol (D1) and at least one isocyanate (I1),
25% to 80% by weight of at least one compound (C1) having at least two isocyanate-reactive groups.
31. The process according to any of embodiments 17 to 30, wherein the thermoplastic elastomer (P1) comprises a polyurethane elastomer based on the following components:
55% to 70% by weight of a mixture of at least one diol (D1) and at least one isocyanate (I1),
30% to 45% by weight of at least one compound (C1) having at least two isocyanate-reactive groups.
32. The process according to any of embodiments 28 to 31, wherein the diol (D1) is selected from the group consisting of ethanediol, butanediol and hexanediol, preferably butane-1,4-diol.
33. The process according to any of embodiments 28 to 31, wherein the at least one isocyanate (I1) is a polyisocyanate, selected from the group consisting of diphenylmethane diisocyanate (MDI), toluene diisocyanate (TDI), hexamethylene diisocyanate (HDI) and dicyclohexylmethane diisocyanate (H12MDI), preferably MDI.
34. The process according to any of embodiments 28 to 33, wherein the at least one compound (C1) having at least two isocyanate-reactive groups is a polyol, preferably pTHF.
35. An elastic membrane comprising an elastomer having an elongation at break of greater than 150% measured according to DIN 53504 obtained or obtainable by the process according to any of embodiments 17 to 34.
36. An elastic fabric comprising a fabric and at least one laminated-on elastic membrane according to any of embodiments 1 to 16 or one elastic membrane obtained or obtainable by the process according to any of embodiments 17 to 34, having an overall elongation at break of greater than 150% measured according to DIN 53504.
37. The use of an elastic membrane according to any of embodiments 1 to 16 or of an elastic membrane obtained or obtainable by the process according to any of embodiments 17 to 34 for the coating of fabric, preferably for the production of an article selected from the group consisting of clothing, shoes, boots, protective clothing, tents, tarpaulins, backpacks and umbrellas.

CITED LITERATURE

U.S. Pat. No. 3,953,566
U.S. Pat. No. 3,962,153
U.S. Pat. No. 5,562,977
Kunststoffhandbuch [Plastics Handbook], 7, "Polyurethane" [Polyurethanes], Carl Hanser Verlag, 1993, section 3.1
"Kunststoffhandbuch" [Plastics Handbook], 7, "Polyurethane" [Polyurethanes], Carl Hanser Verlag, 1966, pages 103-113

The following examples serve to illustrate the invention, but are not restrictive with respect to the subject matter of the invention.

EXAMPLES

1. Chemicals and Formulations

TABLE 1

Chemicals

| Abbreviation | Name | Chemical composition |
|---|---|---|
| Iso1 | Isocyanate | 4,4'-methylenediphenylene diisocyanate |
| Polyol1 | Polyol | polytetrahydrofuran, number-average molar mass Mn = 1000 g/mol, OH number: 111.1 |
| CE1 | Chain extender, diol | butane-1,4-diol |
| AO1 | Antioxidant | sterically hindered phenol |
| LS1 | Light stabilizer 1 | N-(2-ethoxyphenyl)-N'-(2-ethylphenyl)oxamide |
| LS2 | Light stabilizer 2 | dimethyl butanedioate, polymer with 4-hydroxy-2,2,6,6-tetramethyl-1-piperidineethanol |
| GL1 | wax processing aid | (N,N'-ethylenedi(stearamide) |
| NMP | | N-methylpyrrolidone |
| GLY | | glycerol |

TABLE 2

TPU formulations

| Name | TPU 1 Quantity [g] | TPU 2 Quantity [g] | TPU 3 Quantity [g] | TPU Comparison 1 Quantity [g] |
|---|---|---|---|---|
| Polyol1 | 4133 | 3714 | 3098 | — |
| Iso1 | 4547 | 4828 | 5143 | 7365 |
| CE1 | 1265 | 1403 | 1569 | 2655 |
| AO1 | 50 | 50 | 50 | — |
| GL1 | 5 | 5 | — | — |
| LS1 | — | — | 60 | — |
| LS2 | — | — | 60 | — |

2. Test Methods

The liquid entry pressure (LEP) of the membranes was determined in accordance with DIN EN 20811 using a pressure cell having a diameter of 60 mm with ultrapure water (salt-free water, filtered through a Millipore UF system) up to 4.0 bar (40 000 mm water column). The liquid entry pressure LEP is defined as the pressure at which the liquid water starts to permeate through the membrane. A high LEP allows the membrane to withstand a high water column (liquid).

The water vapor permeabilities (WVP) were determined using a cup method at 38° C. and 90% relative humidity in accordance with DIN 53122. Absolute WVP values were determined for a specific membrane thickness. High WVP values were desirable and permitted high water vapor flow rates.

Tensile tests for modulus of elasticity and elongation at break were performed in accordance with DIN 53455/ISO 527.

3. Preparation of the Polymers in the Manual Casting Process

The individual components were used as per table 2. The polyols and chain extenders were initially charged at 80° C. in a container and mixed by vigorous stirring with the components as per the abovementioned formulations in a batch size of 2 kg. The reaction mixture underwent heating to above 110° C. and was then poured out onto a Teflon-coated table heated to approx. 110° C. The cast slab obtained was heat-treated at 80° C. for 15 hours. The material thus produced was comminuted in a mill to give pourable pellets, dried again and filled into aluminum-coated PE bags for further use.

Extrusion was carried out in a twin-screw extruder affording an extrudate diameter of approx. 2 mm.

| Extruder: | Corotating APV MP19 twin-screw extruder |
|---|---|
| Temperature profile: | HZ1 170° C. to 220° C. |
| | HZ2 180° C. to 230° C. |
| | HZ3 190° C. to 230° C. |
| | HZ4 210° C. to 240° C. |
| | HZ5 (die) 200° C. to 240° C. |
| Screw speed: | 100 rpm |
| Pressure: | approx. 10 to 30 bar |
| Extrudate cooling: | water bath (10° C.) |

The temperature profile was selected depending on the softening temperature of the polymer.

4. Production of Porous Membranes with N-Methylpyrrolidone as Polymer Solvent

In a three-neck flask equipped with a magnetic stirrer, 71 ml of N-methylpyrrolidone 1, 10 g of glycerol as second additive and 19 g of TPU polymer as per 3. were mixed together in each case for the TPUs 1, 2 and 3 and also for comparative example 1. The mixture was heated to 60° C. with gentle stirring until the homogeneous, clear, viscous solution thereof was present. The solution was degassed overnight at room temperature. Clear and transparent polymer solutions were obtained.

The polymer solution was subsequently heated again to 60° C. for 2 h and then spread at 60° C. onto a glass plate with a casting knife (150 microns), using an Erichsen coating machine at a speed of 0.2 m/min. The membrane film was left to stand for 30 seconds, subsequently followed by immersion in a water bath at 25° C. for 10 minutes. After detaching the membrane from the glass plate, the membrane was transferred to a water bath for 12 hours. After multiple wash steps with water, the membrane was stored under humid conditions until characterization with respect to LEP and WVP. As comparison 2, a commercially available, porous PTFE film having a thickness of 25 μm without supporting fabric was used. Table 3 summarizes the membrane properties.

TABLE 3

Compositions and properties of the membranes produced; thickness in [μm], LEP in [bar], WVP$_{abs.}$ in [g/m$^2$ * d], modulus of elasticity [MPa], elongation at break [%].

| | TPU | Modulus of elasticity | Elongation at break | Thickness | LEP | WVP$_{abs.}$ |
|---|---|---|---|---|---|---|
| Example 1 | 1 | 86 | 234 | 45 | 3 | 1312 |
| Example 2 | 2 | 118 | 200 | 50 | 3 | 1469 |
| Example 3 | 3 | 132 | 151 | 43 | 3 | 1245 |
| Comparative example 1 | Comparison 1 | 274 | 21 | 50 | 3 | 1224 |
| Comparative example 2 | PTFE | 57 | 64 | 40 | 4 | 2120 |

The porous membranes obtained had improved mechanical properties such as for example an increased modulus of elasticity and an increased elongation at break. At the same time, they had characteristics comparable to membranes of the prior art with respect to WVP and LEP.

5. Pore Size Distribution

The pore size distribution of the membranes as per section 4. was determined for example 1 using Hg porosimetry according to DIN 66133; the results are summarized in table 4:

TABLE 4

Pore size distribution of the membranes of example 1 from section 4

| Pore diameter (μm) | Incremental pore area (m$^2$/g) |
|---|---|
| 0.500 | 0.152 |
| 0.100 | 27.766 |
| 0.050 | 0.604 |
| 0.010 | 0.899 |
| 0.004 | 7.427 |

The average pore diameter was 0.23307 μm and the average pore diameter (area) at 1018.74 psi and 19.968 m$^2$/g was 0.21158 μm.

The membranes from section 4. were likewise examined using scanning electron microscopy (SEM). Both surfaces (bottom and top) of the membranes and also the cross-sectional area were examined. The measurements showed that the membranes had a pore size gradient with small pores in the topmost layer (skin) and larger pores towards the bottom of the membranes.

The invention claimed is:

1. An elastic membrane, comprising:
   an elastomer having an elongation at break of greater than 150% measured according to DIN 53504;
   wherein the elastomer comprises a thermoplastic elastomer (P1),
   wherein the thermoplastic elastomer (P1) comprises a polyurethane elastomer based on the following components:
   11% to 79% by weight of a mixture of at least one diol (D1) and at least one isocyanate (I1), and
   21% to 89% by weight of at least one compound (C1) having at least two isocyanate-reactive groups, which is a polyol,
   wherein the at least one diol (D1) is selected from the group consisting of alkanediol(s) having 2 to 10 carbon atoms in the alkylene portion, and mixtures of two or more thereof,
   wherein the at least one compound (C1) is selected from the group consisting of polyether diols, polyester diols, and mixtures of two or more thereof, and
   wherein the elastic membrane has pores having an average pore diameter of less than 2000 nm, determined by Hg porosimetry in accordance with DIN 66133.

2. The elastic membrane of claim 1, wherein a relative water vapor permeability (WVP$_{rel.}$) at 38° C. and 90% relative humidity in accordance with DIN 53122 is greater than 50 [g*mm/m$^2$*d] and an absolute water vapor permeability (WVP$_{abs.}$) at 38° C. and 90% relative humidity in accordance with DIN 53122 is greater than 1000 [g/m$^2$*d].

3. The elastic membrane of claim 1, wherein a watertightness (LEP) is greater than 2 bar determined according to DIN EN 20811.

4. The elastic membrane of claim 1, wherein the at least one diol (D1) is selected from the group consisting of ethanediol, butanediol and hexanediol.

5. The elastic membrane of claim 1, wherein the at least one isocyanate (I1) is a polyisocyanate, selected from the group consisting of diphenylmethane diisocyanate (MDI), toluene diisocyanate (TDI), hexamethylene diisocyanate (HDI) and dicyclohexylmethane 4,4'-diisocyanate (H12MDI).

6. The elastic membrane of claim 1, wherein the at least one compound (C1) having at least two isocyanate-reactive groups is polytetrahydrofuran (pTHF).

7. An elastic fabric, comprising:
   a fabric and at least one laminated-on elastic membrane of claim 1 having an overall elongation at break of greater than 150% measured according to DIN 53504.

8. A method of coating fabric, the method comprising:
   forming a coating of the elastic membrane of claim 1 on a fabric, optionally to produce an article selected from the group consisting of clothing, shoes, boots, tents, tarpaulins, backpacks and umbrellas.

9. The method of coating fabric according to claim 8, wherein said article is produced and said clothing is protective clothing.

10. The method of coating fabric according to claim 8, wherein said article is produced.

11. The elastic membrane of claim 1, wherein the at least one diol (D1) is at least butane-1,4-diol.

* * * * *

UNITED STATES PATENT AND TRADEMARK OFFICE
CERTIFICATE OF CORRECTION

PATENT NO. : 11,505,662 B2
APPLICATION NO. : 16/646255
DATED : November 22, 2022
INVENTOR(S) : Frank Prissok et al.

It is certified that error appears in the above-identified patent and that said Letters Patent is hereby corrected as shown below:

On the Title Page

Under item (57) "ABSTRACT," at Column 2, Line 6, currently reads:
"11 %"
And should read:
--11%--;

Under item (56) "OTHER PUBLICATIONS," Column 2, Line 5, currently reads:
"Translation ),"
And should read:
--Translation),--;

Under item (56) "OTHER PUBLICATIONS," Column 2, Line 7, currently reads:
"Database"
And should read:
--DATABASE--;

Under item (56) "OTHER PUBLICATIONS," Column 2, Line 9, currently reads:
"7. „Polyurethane,"
And should read:
--7, "Polyurethane",--;

Under item (56) "OTHER PUBLICATIONS," Column 2, Line 10, currently reads:
"Sektion 3.1;"
And should read:
--Section 3.1;--;

Under item (56) "OTHER PUBLICATIONS," Column 2, Line 11, currently reads:
"7, „Polyurethane,"

Signed and Sealed this
Twenty-first Day of May, 2024

Katherine Kelly Vidal
*Director of the United States Patent and Trademark Office*

CERTIFICATE OF CORRECTION (continued)
U.S. Pat. No. 11,505,662 B2

And should read:
--7, "Polyurethane",--;

Under item (56) "OTHER PUBLICATIONS," Column 2, Line 15, currently reads:
"p. 478]."
And should read:
--p. 475].--;

Under item (56) "OTHER PUBLICATIONS," Column 2, Line 20, currently reads:
"physic"
And should read:
--physics--;

Under item (56) "OTHER PUBLICATIONS," Column 2, Line 21, currently reads:
"guide,"
And should read:
--guide.--;

Under item (56) "OTHER PUBLICATIONS," Column 2, Line 24, currently reads:
"No. 20188065991.8,"
And should read:
--No. 201880065991.8,--;

Under item (56) "OTHER PUBLICATIONS," Column 2, Line 25, currently reads:
"Li"
Instead of:
--LI--.